(12) United States Patent
Nussinovitch

(10) Patent No.: US 6,680,184 B2
(45) Date of Patent: *Jan. 20, 2004

(54) ENCAPSULATING LIQUID WITH HYDROCOLLOID MEMBRANE STABLE FROM ABOUT -20 TO 90 DEGREES C WITHOUT BURSTING

(75) Inventor: Amos Nussinovitch, Petach Tikva (IL)

(73) Assignee: Yissum Research & Development Co. of Hebrew University, Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 09/408,580

(22) Filed: Sep. 29, 1999

(65) Prior Publication Data

US 2002/0110882 A1 Aug. 15, 2002

Related U.S. Application Data

(60) Continuation of application No. 08/955,465, filed on Oct. 21, 1997, now Pat. No. 6,099,876, which is a continuation of application No. 08/596,626, filed on Feb. 5, 1996, now abandoned, which is a division of application No. 08/320,755, filed on Oct. 11, 1994, now abandoned.

(51) Int. Cl.[7] .......................... C12N 11/10; C12N 11/12; C12N 5/00; A61K 9/50; C07K 17/10

(52) U.S. Cl. ..................... 435/178; 424/93.1; 424/93.7; 424/490; 424/493; 424/494; 424/496; 426/89; 435/179; 435/182; 435/382; 435/395; 530/813; 530/814; 530/817

(58) Field of Search ................................ 435/177, 178, 435/179, 182, 382, 395; 424/93.1, 93.7, 490, 493, 494, 496; 426/89; 530/813, 814, 817

(56) References Cited

U.S. PATENT DOCUMENTS

| 4,583,320 A | | 4/1986 | Redenbaugh | 47/57.6 |
|---|---|---|---|---|
| 4,702,921 A | | 10/1987 | Ueda | 426/48 |
| 4,749,620 A | * | 6/1988 | Rha et al. | 428/402.2 |
| 4,777,762 A | | 10/1988 | Redenbaugh | 47/57.6 |
| 4,822,534 A | | 4/1989 | Lencki | 264/4.3 |
| 5,093,130 A | * | 3/1992 | Fujii et al. | 424/463 |
| 5,342,626 A | | 8/1994 | Winston | 424/461 |
| 5,424,074 A | * | 6/1995 | Koli et al. | 424/464 |
| 5,587,175 A | | 12/1996 | Viego | 424/427 |
| 6,126,981 A | * | 10/2000 | Lee et al. | 426/548 |

FOREIGN PATENT DOCUMENTS

| DE | 3718934 | 6/1987 |
|---|---|---|
| GB | 1564452 | 9/1976 |
| JP | 01313421 | 6/1988 |

* cited by examiner

Primary Examiner—David M. Naff
(74) Attorney, Agent, or Firm—Joseph A. Mahoney; Mayer, Brown, Rowe & Maw, LLP

(57) ABSTRACT

A temperature-stable droplet is provided containing a temperature-stable hydrocolloid membrane. The hydrocolloid membrane encapsulates a liquid that contains at least one enzyme, a cell, a biological agent, a pharmaceutical agent, an immunological agent, or mixtures thereof, and at least one of a locust bean gum, a natural thickening agent, a guar, polyvinylpyrrolidone, Konjac mannan, methylcellulose, hydroxymethylcellulose, calcium gluconate, glucomannan, or mixtures thereof. Preferably, the hydrocolloid membrane comprises at least one of methoxy pectin, Konjac mannan, sodium alginate, or mixtures thereof, and at least one of a locust bean gum, methylcellulose, hydroxymethylcellulose, glucomannan, or mixtures thereof. The hydrocolloid membrane encapsulating the liquid is a thickness capable of holding the liquid without bursting through a temperature range of about −20° C. to about 90° C.

11 Claims, 1 Drawing Sheet

ENCAPSULATING LIQUID WITH HYDROCOLLOID MEMBRANE STABLE FROM ABOUT -20 TO 90 DEGREES C WITHOUT BURSTING

CROSS RELATED APPLICATIONS

This application is a continuation of application Ser. No. 08/955,465, filed Oct. 21, 1997, now U.S. Pat. No. 6,099,876; which is a continuation of Ser No. 08/596,626, filed Feb. 5, 1996, now abandoned; which is a division of Ser. No. 08/320,755, filed Oct. 11, 1994, now abandoned.

TECHNICAL FIELD OF THE INVENTION

The present invention relates to temperature-stable liquid droplets. More particularly, the present invention relates to temperature-stable liquid droplets having wide application in the food industry and in biotechnological research.

BACKGROUND OF THE INVENTION

As will be described and exemplified in greater detail hereinafter, the droplets of the present invention are especially useful in the food industry. Thus, e.g., thermostable liquid cells filled with juice, wine, coffee and/or other flavours and taste modifiers can be a part of any baked good or dairy product. These droplets hold their liquid content during baking or other heat or freezing processes and have a reasonable shelf life. The liquid core of the droplet is released later, when the food product is chewed.

Similarly, temperature-stable droplets according to the present invention can be used in biotechnological research involving fermentation, chemical production, etc., where microorganisms and human, plant, or animal cells and/or enzymes are included within the drop.

SUMMARY OF THE INVENTION

Figure 1:
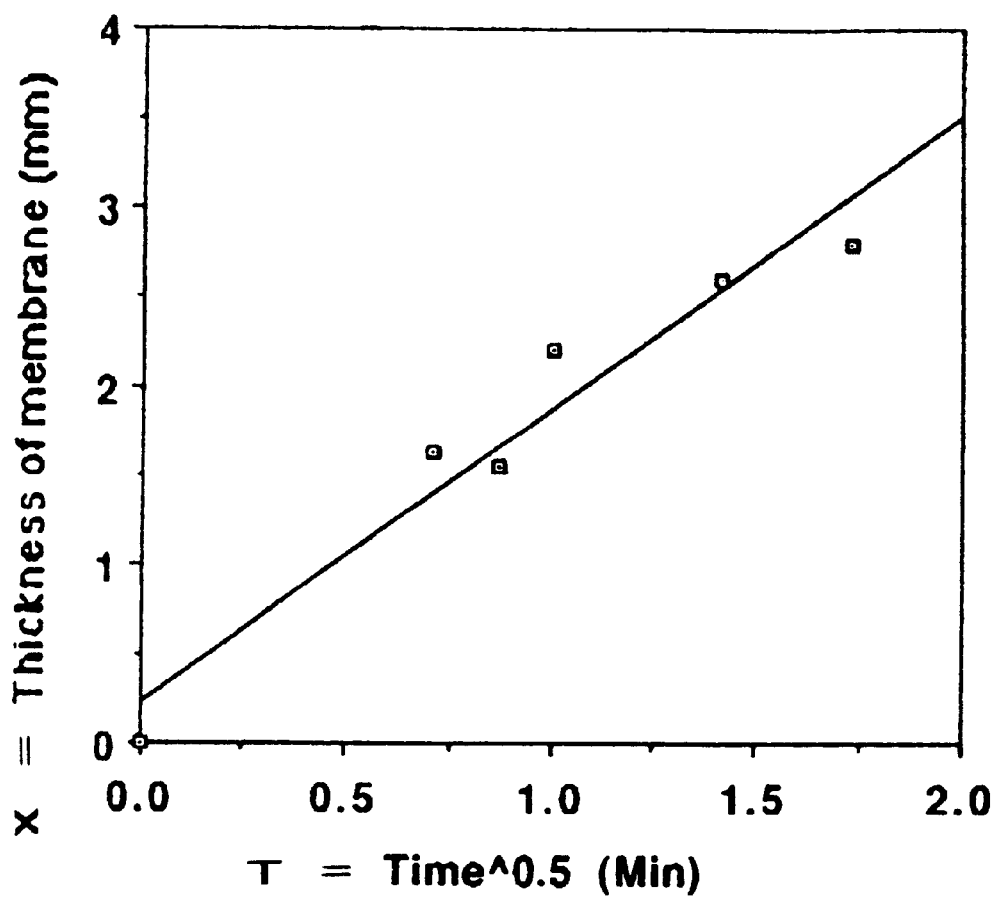
FIG. 1 is a graph describing the membrane thickness versus time exposure dependency.

Disclosed is temperature stable liquid filled cell, in which a desired agent is mixed with a hydrocolloid with the resulting mixture then coated with another hydrocolloid.

DETAILED DESCRIPTION OF THE INVENTION

Thus, according to the present invention, there is now provided a temperature-stable liquid droplet comprising a temperature-stable hydrocolloid membrane, said hydrocolloid being selected from low methoxy pectin (LMP), Konjac mannan, sodium alginate, or a mixture thereof, said membrane encapsulating a droplet of an edible product or a droplet containing a microorganism, an enzyme or a cell.

As indicated, the content of the droplet, which includes thermostable ingredients, is coated with a thin membrane. The droplet can withstand boiling temperatures and other harsh heat treatments, such as baking and autoclaving; and in preferred embodiments of the present invention, said droplets are stable through a temperature range of −20° C. to 90° C. With the proper freezing technique, leakage from the cell is minimal and the present droplets can therefore also withstand freezing and thawing cycles without bursting.

Droplets of different sizes can be produced, from a few microns to half a centimeter in diameter. If the droplet's symmetry, which is usually spherical, is unimportant, then even larger droplets can easily be produced. The thickness of the coating membrane can also be controlled, as described and explained hereinbelow.

The general procedure for producing the droplets of the present invention is as follows:

a) For food purposes, edible liquids concentrated two- to six-fold (such as citrus juice, tomato paste, coffee concentrate, etc.) may be used in an aqueous or organic base. LBG (locust bean gum) or other natural thickening agents, such as guar, modified thickener or a synthetic gum such as PVP (polyvinylpyrrolidone), at a concentration of 0–2%, may also be added to the liquid core. The amount of two-valence cations in the liquid is checked and, if necessary, adjusted to a minimum of 0.75 mg/g dry matter of the hydrocolloid being used to build the membrane. For biotechnological purposes, enzymes, cells, etc. are mixed with the liquid filling.

b) Droplet formation: All ingredients are mixed into the liquid making up the interior of the droplet. These liquids are dropped (or sprayed) into a 0.1–3.0% solution of sodium alginate, low methoxy pectin, konjac mannan, or a mixture thereof. Ingredients such as sugar, salts, or other hydrocolloids can also be added to this mixture. The height of the dripping equipment (a set of hypodermic needles, a suitable spraying device, extrusion devices, etc.) above the membrane-ingredient solution, as well as the mixing intensity of this solution, determines size and shape of the final droplet.

c) Thickness and composition of the coating membrane: Thickness of the membrane coating the liquid is a function of elapsed time, while ingredient concentrations are kept constant. More specifically, thickness is linearly related to the square root of time, as shown in FIG. 1 appended hereto, in which X is the thickness of the membrane and T is elapsed time. The coating membrane can be composed of LMP, konjac mannan or sodium alginate, or a mixture of the two. In order to withstand very high temperatures, 0.1–3.0% methyl cellulose (Methocell) is added. Polyol-like materials, such as glycerol, may also be added. Added salts lower the freezing temperature and make the entire droplet less susceptible to changes during freezing.

While the invention will now be described in connection with certain preferred embodiments in the following examples so that aspects thereof may be more fully understood and appreciated, the invention is not limited to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1

The following components were combined, as described hereinafter:

| | | |
|---|---|---|
| Brix 65 Orange concentrate | (800 grams) | 80% by weight |
| Orange juice | (89 grams) | 8.9% by weight |
| Water | (100 grams) | 10% by weight |
| LBG | (5 grams) | 0.5% by weight |
| Methyl cellulose | (5 grams) | 0.5% by weight |
| Flavoring agents | (1 gram) | 0.1% by weight |

Method of Preparation:

The methyl cellulose is dissolved in the orange juice by creating a dispersion of methyl cellulose in juice and water heated to 85–95° C., in which LBG has been previously dissolved. Thirty-three percent of the total juice and all the water is used for this first stage. This mixture is stirred and shaken well until a smooth consistency is obtained. The remaining juice is frozen and then added, and the temperature of the resulting mixture is reduced to 15° C. The orange concentrate is then added and the entire resulting mixture once again stirred until smooth and uniform. The mixture is then dripped into a solution of 4% sodium alginate. Liquid drops are obtained, each of which is surrounded by an individual membrane. A membrane forms slowly around each of the drops during the first 15 minutes. The rate of membrane thickening decreases with time, wherein at the beginning of the process the thickness of the membrane is directly proportional to the square root of time elapsed. The drops which are formed are washed with tap water and transferred for further processing or freezing. In other words, at this point the juice droplets can already be introduced into a final product.

In the above process, the solution of 4% sodium alginate is prepared by adding 4 grams of sodium alginate to 96 grams of water with stirring. Hydrocolloid powder is added slowly in order to ensure proper dissolution. This solution can be prepared one or several days beforehand and refrigerated or preserved for a few days before use. If refrigerated, the solution should be removed from refrigeration several hours before its intended use, so that it can return to room temperature.

EXAMPLE 2

The following components were combined, as described hereinafter:

| Coffee solution (50 grams instant coffee in 300 grams of tap water) | 35% by weight |
| Hydroxymethyl cellulose (20 grams) | 2% by weight |
| Water (630 grams) | 62.9% by weight |
| Flavoring agents (1 gram) | 0.1% by weight |

Method of Preparation:

Coffee crystals are dissolved in hot water, and the resulting solution is evaporated and concentrated until at least 2% salts are found in the concentrated solution. (As described in B. K. Watt and A. L. Merrill, "Compositions of Foods," USDA (1963), 100 grams coffee contains 179 mg of calcium, 383 mg phosphorus, 5.6 mg iron, 72 mg sodium and 3256 grams potassium.) Alternatively, it is possible to add 0.5% calcium lactate and 0.25% calcium acetate into the coffee and water solution to supplement the salt content and eliminate the need for concentration. The solution is then heated and 2% hydroxymethyl cellulose is added to 30% by volume of the concentrated coffee solution, the cellulose being at a temperature of about 90° C. The remaining coffee concentrate is added frozen, with vigorous stirring until the entire solution reaches a temperature of 10° C. This resulting solution is then dripped into a mixture of 1% sodium alginate and 1% low ester pectin (otherwise known as LMP). The solution of sodium alginate and LMP is prepared in the same manner as the solution of sodium alginate alone described in Example 1 hereinabove. Liquid drops are obtained, each of which is surrounded by a membrane. These coated drops are then washed and transferred for further processing or for freezing. The frozen drops of coffee are heat-resistant and can be added to milk products.

As will be realised, the above two examples relate to the preparation of products which can be used in the food industry.

EXAMPLE 3

Locust bean gum is dissolved in a 4% salt water solution until the final concentration of the hydrocoloid system reaches 0.5%. Calcium gluconate (0.5%) is also dissolved into this solution. In 500 grams of the saline solution, 1.5% methyl cellulose (methocell) and 1.5% Konjac mannan are then dissolved. The entire amount of methoxy cellulose is added to the aqueous system, which is then heated to 87° C. Ice crystals are added until the system is cooled to room temperature. To this solution is added a suspension of suitable cells. As in Examples 1 and 2 above, the resulting solution is then dripped into a 3% solution of LMP. Liquid drops are obtained, each of which drops is surrounded by a membrane. These coated drops are then washed and transferred for further processing or for freezing.

It will be evident to those skilled in the art that the invention is not limited to the details of the foregoing illustrative examples and that the present invention may be embodied in other specific forms without departing from the essential attributes thereof. It is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A temperature-stable droplet, comprising:

a liquid consisting essentially of at least one of an enzyme, a cell, a biological agent, a pharmaceutical agent, an immunological agent, or mixtures thereof, and at least one of locust bean gum, a natural thickening agent, guar, polyvinylpyrrolidone, Konjac mannan, methylcellulose, hydroxymethylcellulose, calcium gluconate, glucomannan, or mixtures thereof and a temperature-stable hydrocolloid membrane encapsulating the liquid, the hydrocolloid membrane comprising at least one of methoxy pectin, Konjac mannan, sodium alginate, or mixtures thereof, and at least one of locust bean gum, methylcellulose, hydroxymethylcellulose, glucomannan, or mixtures thereof;

wherein the hydrocolloid membrane encapsulating the liquid has a thickness capable of holding the liquid without bursting through a temperature range of about −20° C. to about 90° C.

2. A temperature stable droplet, made by the process of:

(a) mixing a liquid consisting essentially of at least one of an enzyme, a cell, a biological agent, a pharmaceutical agent, an immunological agent, or mixtures thereof, and at least one of locust bean gum, a natural thickening agent, guar, polyvinylpyrrolidone, Konjac mannan, methylcellulose, hydroxymethylcellulose, calcium gluconate, glucomannan, or mixtures thereof, together in solution; and (b) encapsulating the resulting solution in a hydrocolloid membrane comprising at least one of methoxy pectin, Konjac mannan, sodium alginate, or mixtures thereof, and at least one of locust bean gum, methylcellulose, hydroxymethylcellulose, glucomannan, or mixtures thereof;

wherein
the hydrocolloid membrane encapsulating the liquid has a thickness capable of holding the liquid without bursting through a temperature range of about −20° C. to about 90° C.

3. The temperature-stable droplet of claim 2, wherein the step of mixing the liquid further includes the step of homogeneously mixing the liquid.

4. The temperature-stable droplet of claim 1 or 2, wherein the liquid is a mixture of human cells and methylcellulose.

5. The temperature-stable droplet of claim 1 or 2, wherein the liquid is mixture of plant cells and methylcellulose.

6. The temperature-stable droplet of claim 1 or 2, wherein the biological agent is a microorganism.

7. A method of making a temperature stable liquid, comprising:
   (a) mixing a liquid consisting essentially of at least one of an enzyme, a cell, a biological agent, a pharmaceutical agent, an immunological agent, or mixtures thereof, and at least one of locust bean gum, a natural thickening agent, guar, polyvinylpyrrolidone, Konjac mannan, methylcellulose, hydroxymethylcellulose, calcium gluconate, glucomannan, or mixtures thereof, together in solution; and
   (b) encapsulating the resulting solution in a hydrocolloid membrane the hydrocolloid membrane comprising at least one of methoxy pectin, Konjac mannan, sodium alginate, or mixtures thereof, and at least one of locust bean gum, methylcellulose, hydroxymethylcellulose, glucomannan, or mixtures thereof,
   wherein
   the hydrocolloid membrane encapsulating the liquid has a thickness capable of holding the liquid without bursting through a temperature range of about −2° C. to about 90° C.

8. The method of claim 7, wherein the step of mixing the liquid further includes the step of homogeneously mixing the liquid.

9. The method of claim 7, wherein the liquid is a mixture of human cells and methylcellulose.

10. The method of claim 7, wherein the liquid is mixture of plant cells and methylcellulose.

11. The method of claim 7, wherein the biological agent is a microorganism.

* * * * *